(12) United States Patent
Nakamura et al.

(10) Patent No.: US 10,876,002 B2
(45) Date of Patent: Dec. 29, 2020

(54) RESIN COMPOSITION FOR FRP, FRP SHEET AND MOLDED PRODUCT

(71) Applicants: YAMAHA CORPORATION, Hamamatsu (JP); YAMAHA FINE TECHNOLOGIES CO., LTD., Hamamatsu (JP)

(72) Inventors: Yasutaka Nakamura, Hamamatsu (JP); Kazuhiro Muneta, Hamamatsu (JP); Takayuki Endo, Hamamatsu (JP); Yutaka Hamada, Hamamatsu (JP)

(73) Assignees: Yamaha Corporation, Hamamatsu (JP); Yamaha Fine Technologies Co., Ltd., Hamamatsu (JP)

( * ) Notice: Subject to any disclaimer, the term of this patent is extended or adjusted under 35 U.S.C. 154(b) by 0 days.

(21) Appl. No.: 16/019,647

(22) Filed: Jun. 27, 2018

(65) Prior Publication Data

US 2018/0305551 A1    Oct. 25, 2018

Related U.S. Application Data

(63) Continuation of application No. PCT/JP2016/088692, filed on Dec. 26, 2016.

(30) Foreign Application Priority Data

Dec. 28, 2015 (JP) .................... 2015-257413

(51) Int. Cl.
| | | |
|---|---|---|
| *C08L 101/00* | (2006.01) | |
| *C08J 5/04* | (2006.01) | |
| *C08F 2/44* | (2006.01) | |
| *C08F 2/00* | (2006.01) | |
| *B64C 1/00* | (2006.01) | |
| *B29C 70/48* | (2006.01) | |
| *C08J 5/24* | (2006.01) | |
| *B29C 70/44* | (2006.01) | |
| *C08F 265/04* | (2006.01) | |
| *D06M 15/263* | (2006.01) | |
| *B29C 70/50* | (2006.01) | |
| *B60R 13/02* | (2006.01) | |
| *C08F 20/18* | (2006.01) | |

(52) U.S. Cl.
CPC ........ *C08L 101/005* (2013.01); *B29C 70/443* (2013.01); *B29C 70/48* (2013.01); *B29C 70/50* (2013.01); *B64C 1/00* (2013.01); *C08F 2/00* (2013.01); *C08F 2/44* (2013.01); *C08F 265/04* (2013.01); *C08J 5/042* (2013.01); *C08J 5/24* (2013.01); *D06M 15/263* (2013.01); *B60R 13/02* (2013.01); *C08F 20/18* (2013.01); *C08J 2333/08* (2013.01); *C08J 2333/10* (2013.01); *C08J 2333/12* (2013.01); *C08J 2433/08* (2013.01); *C08J 2433/10* (2013.01); *C08L 2207/53* (2013.01)

(58) Field of Classification Search
CPC .................. C08L 101/00; C08J 5/04
USPC ........................................ 524/495
See application file for complete search history.

(56) References Cited

U.S. PATENT DOCUMENTS

| | | | | |
|---|---|---|---|---|
| 6,916,545 B2* | 7/2005 | Yano | ...................... | B32B 27/08 427/407.1 |
| 6,974,784 B1 | 12/2005 | Nonaka et al. | | |
| 2003/0108734 A1 | 6/2003 | Yano et al. | | |
| 2004/0097627 A1* | 5/2004 | Vallittu | ................... | A61K 6/887 524/430 |
| 2014/0004365 A1* | 1/2014 | Kitazono | ............... | B05D 7/572 428/483 |

FOREIGN PATENT DOCUMENTS

| | | | |
|---|---|---|---|
| CN | 102558701 A | | 7/2012 |
| JP | 4-226740 A | | 8/1992 |
| JP | 2000-327813 A | | 11/2000 |
| JP | 2001-38724 A | | 2/2001 |
| JP | 2001-294634 A | | 10/2001 |
| JP | 2001294634 A | * | 10/2001 |
| JP | 2003-238211 A | | 8/2003 |
| JP | 2004-525216 A | | 8/2004 |
| JP | 2005-48059 A | | 2/2005 |
| JP | 2005-81602 A | | 3/2005 |

(Continued)

OTHER PUBLICATIONS

Extended European Search Report issued in counterpart European Application No. 16881724.5 dated Jul. 19, 2019 (five (5) pages). International Search Report (PCT/ISA/210) issued in PCT Application No. PCT/JP2016/088692 dated Jan. 31, 2017 with English translation (four (4) pages).

(Continued)

*Primary Examiner* — Deve V Hall

(74) *Attorney, Agent, or Firm* — Crowell & Moring LLP

(57) ABSTRACT

It is an object of the present invention to provide a resin composition for FRP, an FRP sheet and a molded product that enable inhibition of the whitening in and between fiber bundles. A resin composition for FRP according to an embodiment of the present invention is a resin composition with which a fibrous reinforcement sheet is to be impregnated for formation of FRP, and contains methyl methacrylate as a principal component, a methyl methacrylate polymer, a polymerization initiator, and at least one of dendrimer (meth)acrylate and glycidyl (meth)acrylate, as a monomer. An FRP sheet according to another embodiment of the present invention includes a matrix and a fibrous reinforcement sheet in the matrix. The matrix contains the hardened resin composition for FRP.

9 Claims, 1 Drawing Sheet

(56) References Cited

FOREIGN PATENT DOCUMENTS

JP    2006-257391    *  9/2012
WO    WO2012/137864  * 10/2012

OTHER PUBLICATIONS

Japanese-language Written Opinion (PCT/ISA/237) issued in PCT Application No. PCT/JP2016/088692 dated Jan. 31, 2017 (four (4) pages).
Japanese-language Office Action issued in counterpart Japanese Application No. 2017-559180 dated Jun. 4, 2019 with English translation (five (5) pages).
Chinese-language Office Action issued in Chinese Application No. 201680076602.2 dated Mar. 4, 2020 with English translation (18 pages).

* cited by examiner

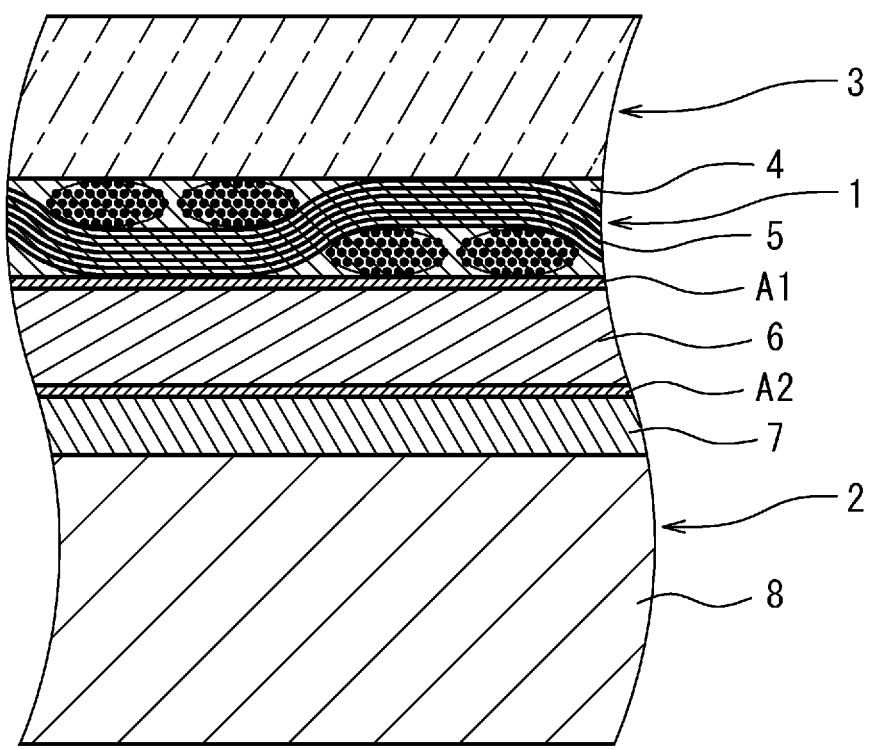

RESIN COMPOSITION FOR FRP, FRP SHEET AND MOLDED PRODUCT

BACKGROUND OF THE INVENTION

Field of the Invention

The present invention relates to a resin composition for FRP, an FRP sheet and a molded product.

Description of the Related Art

Fiber reinforced plastics (FRPs) in sheet form obtained by impregnating woven fabric with a resin now find a wide variety of uses. Some types of such FRP sheets are used as interior materials which take advantage of aesthetic effects created by weave patterns of woven fabric. In particular, a composite material including: an FRP sheet obtained by impregnating woven fabric with a resin; a resin substrate layer laminated on the FRP sheet; and a transparent resin coating layer as a top layer of the FRP sheet is used as, for example, an interior panel for an automobile.

Of the FRPs, carbon fiber reinforced plastics (CFRPs) obtained by impregnating carbon fiber woven fabric with a resin are used as molded products for wings of aircrafts, fliers of windmills, tennis rackets, fishing rods, and the like. Specifically, CFRP sheets obtained by impregnating carbon fiber woven fabric with a resin are formed into a laminate having a desired shape, and then the laminate is heated to harden the resin, whereby a molded product formed of CFRP is obtained.

A method for forming an FRP in sheet form has been known in which, for example, a textile is impregnated with a thermosetting epoxy resin composition and is subsequently subjected to heat. Unfortunately, this method is time-consuming because it takes much time to harden the thermosetting epoxy resin. Worse yet, the thermosetting epoxy resin yellows after being irradiated with ultraviolet rays. An alternative to the method has been studied which involves impregnation of a textile with a highly weather-resistant resin such as an acrylic resin to form an FRP in sheet form within a shorter period of time.

For example, Japanese Unexamined Patent Application, Publication No. H4-226740 discloses forming an FRP sheet through impregnation of a textile with a resin composition containing: methyl methacrylate as a principal component; and a methyl methacrylate polymer. The aforementioned publication teaches that the FRP sheet is formable by, for example, hot pressing, and that a thermoformable sandwich plate may be obtained by heat welding or bonding the FRP sheet to a resin plate.

Such an FRP sheet designed to produce aesthetic effects is typically woven of comparatively thick fiber bundles (threads) to emphasize its weave pattern. The resin that bonds individual fibers together makes up a comparatively small proportion of the fiber bundles, and therefore these fiber bundles might be separated under a load during, for example, a thermal cycle. Thus separated fiber bundles might appear as a whitish defect (hereinafter referred to as "whitening").

The whitening is likely to occur when there is a significant difference in coefficient of linear expansion between the fibers and the resin. In particular, it is highly likely that whitening occurs in peripheral portions of the FRP sheet. It is inferred that an end face of the FRP sheet and the vicinity of the end face are subject to greater stress than any other part of the FRP sheet due to the difference in coefficient of linear expansion.

In the case where no aesthetic effects are expected of the FRP molded product, the occurrence of or the possibility of the occurrence of whitening in a fiber bundle and between individual fiber bundles, namely, the occurrence of or the possibility of the occurrence of separation in a fiber bundle or separation between individual fiber bundles may decrease the strength of the molded product, and is not preferred accordingly.

PRIOR ART DOCUMENT

Patent Document

Patent Document 1: Japanese Unexamined Patent Application, Publication No. H4-226740

SUMMARY OF THE INVENTION

Problems to be Solved by the Invention

In view of the inconvenience described above, it is an object of the present invention to provide a resin composition for FRP, an FRP sheet and a molded product that enable inhibition of the whitening in and between fiber bundles.

Means for Solving the Problems

An aspect of the invention made for solving the aforementioned problems is a resin composition with which a fibrous reinforcement sheet is to be impregnated for formation of FRP, i.e., a resin composition for FRP containing: methyl methacrylate as a principal component; a methyl methacrylate polymer; a polymerization initiator; and at least one of dendrimer (meth)acrylate and glycidyl (meth)acrylate, as a monomer.

After the fibrous reinforcement sheet is impregnated with the resin composition for FRP, in the state in which the resin composition is hardened through polymerization of, for example, methyl methacrylate, linkages are formed between the molecular chains of the methyl methacrylate polymer, or between the methyl methacrylate polymer and the fibers constituting the reinforcement sheet, due to dendrimer (meth)acrylate or glycidyl (meth)acrylate contained in the resin composition for FRP. The term "fibrous reinforcement sheet" as referred to herein means a fibriform reinforcement member in sheet form. The term "principal component" as referred to herein means a component contained in the highest proportion on a mass basis. The term "(meth)acrylate" as referred to herein means "acrylate and/or methacrylate".

A content of dendrimer (meth)acrylate or glycidyl (meth)acrylate with respect to 100 parts by mass of methyl methacrylate is 1 part by mass or more and 25 parts by mass or less.

It is preferred that the resin composition for FRP further contains particles containing, at least in surface layers thereof, an acrylic resin as a principal component. A mean particle diameter of the particles is preferably 0.02 μm or more and 0.3 μm or less. A content of the particles with respect to 100 parts by mass of methyl methacrylate is 1 part by mass or more and 20 parts by mass or less. The term "mean particle diameter" as referred to herein means a volume mean particle diameter determined in a manner including: preparing a thin slice from the FRP with a microtome; taking an image of the thin slice with a transmission electron microscope (TEM); and analyzing the image in accordance with JIS-Z8827-1 (2008) for determination of the volume mean particle diameter of 100 or more particles seen in the image.

It is preferred that each of the particles has a core-shell structure and that in the core-shell structure, an elastic modulus of a shell is greater than an elastic modulus of a core.

Another aspect of the present invention made for solving the aforementioned problems is an FRP sheet including a matrix and a fibrous reinforcement sheet in the matrix. The matrix contains the hardened resin composition for FRP.

Still another aspect of the present invention made for solving the aforementioned problems is a molded product including the FRP sheet and a substrate layer laminated on one face side of the FRP sheet.

Yet another aspect of the present invention made for solving the aforementioned problems is a molded product including a matrix and a fibrous reinforcement sheet in the matrix. The matrix contains the hardened resin composition for FRP.

Effects of the Invention

Therefore, the resin composition for FRP, the FRP sheet and the molded product according to the aspects of the present invention enable inhibition of the whitening in and between fiber bundles.

BRIEF DESCRIPTION OF THE DRAWING

FIG. 1 is a schematic cross-sectional view of a laminated structure of a molded product according to an embodiment of the present invention.

DESCRIPTION OF THE EMBODIMENTS

Embodiments of the present invention will be described below in detail, with appropriate reference to the drawing.
Resin Composition for FRP A resin composition for FRP according to an embodiment of the present invention is a resin composition with which a fibrous reinforcement sheet is to be impregnated for the formation of FRP.

The resin composition for FRP contains: methyl methacrylate (MMA) as a principal component; a methyl methacrylate polymer (PMMA); a polymerization initiator; and dendrimer (meth)acrylate or glycidyl (meth)acrylate as a monomer. In some embodiments, the resin composition for FRP may contain, as a monomer, both dendrimer (meth)acrylate and glycidyl (meth)acrylate.

The resin composition for FRP may further contain particles containing, at least in surface layers thereof, an acrylic resin as a principal component.
Methyl Methacrylate Methyl methacrylate is polymerized to form a methyl methacrylate polymer (an acrylic resin). This yields a matrix with which spaces between individual fibers of the reinforcement sheet are to be filled in the formation of a fiber reinforced plastic (FRP).
Methyl Methacrylate Polymer The methyl methacrylate polymer imparts an appropriate viscosity to the resin composition for FRP. After being polymerized, the methyl methacrylate polymer is integrated with the methyl methacrylate polymer formed by polymerization of methyl methacrylate contained in the resin composition as a principal component.

The lower limit of the content of the methyl methacrylate polymer with respect to 100 parts by mass of methyl methacrylate is preferably 5 parts by mass, and more preferably 10 parts by mass. The upper limit of the content of the methyl methacrylate polymer with respect to 100 parts by mass of methyl methacrylate is preferably 25 parts by mass, and more preferably 20 parts by mass. In the case where the content of the methyl methacrylate polymer is less than the lower limit, the reinforcement sheet impregnated with the resin composition for FRP may fail to hold the resin composition, making it less easy to produce FRP. Conversely, in the case where the content of the methyl methacrylate polymer is greater than the upper limit, the resin composition for FRP may become too viscous, making it less easy to impregnate the reinforcement sheet with the resin composition for FRP.
Polymerization Initiator The polymerization initiator induces polymerization of methyl methacrylate and the methyl methacrylate polymer.

As the polymerization initiator, a radical polymerization initiator, an addition polymerization initiator, a living polymerization initiator, an oxidative polymerization initiator, a photopolymerization initiator or the like may be used. Of these, a radical polymerization initiator that yields a comparatively high hardening rate is suitably used.

The radical polymerization initiator is a compound that generates radicals to initiate polymerization of a monomer. As the radical polymerization initiator, a compound having an —O—O— bond (an organic peroxide), a compound having a —N=N— bond (an azo compound), a compound having a —S—S— bond (a disulfide compound) or the like may be used.

The lower limit of the content of the polymerization initiator with respect to 100 parts by mass of methyl methacrylate is preferably 0.2 parts by mass, and more preferably 0.5 parts by mass. The upper limit of the content of the polymerization initiator with respect to 100 parts by mass of methyl methacrylate is preferably 5 parts by mass, and more preferably 3 parts by mass. In the case where the content of the polymerization initiator is less than the lower limit, the polymerization initiator may fail to accelerate polymerization of methyl methacrylate sufficiently, resulting in insufficient hardening of FRP. Conversely, in the case where the content of the polymerization initiator is greater than the upper limit, the strength of FRP may be insufficient owing to a compound derived from the polymerization initiator and contaminated as an impurity.
Dendrimer (Meth)Acrylate Dendrimer (meth)acrylate is a polymer or an oligomer in a tree-like form having multiple branches and subbranches extending three-dimensionally and omnidirectionally in an approximately symmetrical manner around the core, and has a (meth)acryl group at the end of each subbranch.

On the outer side of dendrimer (meth)acrylate, the (meth)acryl group forms linkages between molecular chains of a methyl methacrylate polymer formed by polymerization of methyl methacrylate, and also between the molecular chains of the methyl methacrylate polymer formed by polymerization and constituent components of the reinforcement sheet (i.e., fibers). It is inferred that these linkages, particularly the linkages between the molecular chains of the methyl methacrylate polymer, enhance the toughness of FRP. Thus, the use of the resin composition for FRP containing dendrimer (meth)acrylate enables inhibition of whitening, which might be otherwise caused by separation of fiber bundles in FRP.

Dendrimer (meth)acrylate is obtained by, for example, acrylating a dendrimer polyol including a hydroxy group at the end of each subbranch, or bonding a polyfunctional acrylate to the periphery of a core compound through addition polymerization.

The lower limit of the content of dendrimer (meth) acrylate with respect to 100 parts by mass of methyl methacrylate is preferably 1 part by mass, and more preferably 2 parts by mass. The upper limit of the content of dendrimer (meth)acrylate with respect to 100 parts by mass of methyl methacrylate is preferably 25 parts by mass, more preferably 15 parts by mass, and still more preferably 5 parts by mass. In the case where the content of dendrimer (meth)acrylate is less than the lower limit, whitening in FRP may not be inhibited sufficiently. Conversely, in the case where the content of dendrimer (meth)acrylate is greater than the upper limit, crosslinking between molecules of the methyl methacrylate polymer forming the framework of FRP may be accelerated, leading to greater rigidity of the polymer and reduced toughness of FRP, and thus resulting in insufficient inhibition of the whitening in FRP.

Even after the hardening, it is possible to confirm the presence of dendrimer (meth)acrylate in the resin composition for FRP by observation under a transmission electron microscope.

Glycidyl (Meth)Acrylate

Glycidyl (meth)acrylate forms linkages between molecular chains of a methyl methacrylate polymer obtained by polymerization, and also between the molecular chains of the methyl methacrylate polymer obtained by polymerization and fibers constituting the reinforcement sheet. It is inferred that these linkages, particularly the linkages between the molecular chains of the methyl methacrylate polymer obtained by polymerization and the fibers constituting the reinforcement sheet, enhance the toughness of FRP. The use of the resin composition for FRP containing glycidyl (meth)acrylate enables inhibition of whitening, which might be otherwise caused by separation of fiber bundles in FRP.

The lower limit of the content of glycidyl (meth)acrylate with respect to 100 parts by mass of methyl methacrylate is preferably 1 part by mass, more preferably 3 parts by mass, and still more preferably 5 parts by mass. The upper limit of the content of glycidyl (meth)acrylate with respect to 100 parts by mass of methyl methacrylate is preferably 25 parts by mass, more preferably 20 parts by mass, and still more preferably 15 parts by mass. In the case where the content of glycidyl (meth)acrylate is less than the lower limit, whitening in FRP may not be inhibited sufficiently. Conversely, in the case where the content of glycidyl (meth) acrylate is greater than the upper limit, the methyl methacrylate polymer forming the framework of FRP may fail to grow, and consequently, whitening in FRP again may not be inhibited sufficiently.

Even after the hardening, it is possible to confirm the presence of glycidyl (meth)acrylate in the resin composition for FRP by infrared spectroscopy.

Particles

It is preferred that the particles to be contained in the resin composition for FRP contain, at least in surface layers thereof, an acrylic resin having a high affinity for the methyl methacrylate polymer, as a principal component. After being hardened through polymerization, the resin composition for FRP has enhanced toughness owing to such particles. This feature enables more reliable inhibition of the whitening in and between fiber bundles constituting the FRP sheet.

It is preferred that the particles to be contained in the resin composition for FRP has a core-shell structure and that in the core-shell structure, the elastic modulus of the shell being the surface layer of each particle is greater than the elastic modulus of the core of the particle. The core-shell structure in which the elastic modulus of the shell is greater than the elastic modulus of the core, enables strengthening of the linkages between the molecular chains of the methyl methacrylate polymer, and also enables imparting of greater flexibility to the linkages between the molecular chains of the methyl methacrylate polymer, thereby further enhancing the toughness of the resin composition. Thus, this feature enables still more reliable inhibition of the whitening in and between fiber bundles constituting the FRP sheet.

The lower limit of the mean particle diameter of the particles in the resin composition for FRP is preferably 0.02 µm, and more preferably 0.05 µm. The upper limit of the mean particle diameter of the particles in the resin composition for FRP is preferably 0.8 µm, and more preferably 0.5 µm. In the case where the mean particle diameter of the particles in the resin composition for FRP is less than the lower limit, the sufficient effect of enhancing the toughness may not be attained. Also, the particles may be unduly expensive, and the resin composition for FRP in turn may be unduly expensive. Conversely, in the case where the mean particle diameter of the particles in the resin composition for FRP is greater than the upper limit, the particles may fail to fill the interstice between the fibers constituting the reinforcement sheet, and in turn, may fail to boost the effect of inhibiting whitening.

The lower limit of the content of the particles in the resin composition for FRP with respect to 100 parts by mass of methyl methacrylate is preferably 1 part by mass, and more preferably 3 parts by mass. The upper limit of the content of the particles in the resin composition for FRP with respect to 100 parts by mass of methyl methacrylate is preferably 20 parts by mass, and more preferably 15 parts by mass. In the case where the content of the particles in the resin composition for FRP is less than the lower limit, the particles may fail to boost the effect of inhibiting whitening. Conversely, in the case where the content of the particles in the resin composition for FRP is greater than the upper limit, the resin composition may permeate the reinforcement sheet insufficiently. Also, an additive may be needed for dispersion of the particles, and in turn, may deteriorate, for example, the heat resistance and other physical properties of the resin composition for FRP.

In the case where the fibrous reinforcement sheet is impregnated with the resin composition for FRP and then the resin composition for FRP is hardened through polymerization of methyl methacrylate and the like, linkages are formed between the molecular chains of the methyl methacrylate polymer, or between the methyl methacrylate polymer and the fibers constituting the reinforcement sheet, due to dendrimer (meth)acrylate or glycidyl (meth)acrylate contained in the resin composition for FRP. Thus, the FRP molded product formed from the resin composition for FRP has enhanced toughness, which reduces the risk of separation of fiber bundles. Therefore, inhibition of the whitening in and between fiber bundles is enabled, leading to superior aesthetic appearances and high strength of the FRP molded product.

The resin composition for FRP can have a comparatively small viscosity although the strength of the resin composition having been hardened can be equivalent to that of a conventionally used epoxy resin. Thus, the resin is capable of penetrating the fibers effectively, and then hardening is permitted. This enables low-cost production of various types of FRP molded products of which strength is required. After being hardened, the resin composition for FRP has a comparatively high vibration damping factor. Thus, the use of the resin composition for FRP enables production of articles having adequately high strength and vibration damping factor. Examples of such articles to be produced include wings of aircrafts, fliers of windmills, tennis rackets, speaker cabinets, fishing rods, etc.

The following describes a molded product according to another embodiment of the present invention.

Molded Product

The molded product shown in FIG. 1 may be used as an interior material from which an interior panel for an automobile (e.g., a door-trim panel, an ornamental cover for a center console, an ornamental cover for a dash board) is formed. Thus, the molded product may have a predetermined flat shape or may be curved so as to fit into the intended installation site.

The molded product includes: an FRP sheet 1, which is still another embodiment of the present invention; and a substrate layer 2 laminated on one face side (a back face side in the present embodiment) of the FRP sheet 1. It is preferred that the molded product also includes a protective layer 3, which is laminated on another face side (a front face side) of the FRP sheet 1 as shown in FIG. 1 and is transparent. It is to be noted that the term "front face" as referred to herein means the face of the molded product on the viewer's side, and the term "back face" as referred to herein means the face opposite thereto.

FRP Sheet

The FRP sheet 1 includes a matrix 4 and a reinforcement sheet 5 in the matrix 4.

The lower limit of the average thickness of the FRP sheet 1 is preferably 0.1 mm, and more preferably 0.3 mm. The upper limit of the average thickness of the FRP sheet 1 is preferably 1.0 mm, and more preferably 0.8 mm. In the case where the average thickness of the FRP sheet 1 is less than the lower limit, the FRP sheet 1 may fail to have adequate aesthetic effects and/or may be broken while being formed. Conversely, in the case where the average thickness of the FRP sheet 1 is greater than the upper limit, it may be difficult to mold the FRP sheet 1 by hot pressing.

Matrix

The matrix 4 is obtained by hardening the resin composition for FRP according to one embodiment of the present invention described above. Specifically, the matrix 4 is formed through polymerization of methyl methacrylate in the state in which the reinforcement sheet 5, which will be described below, is impregnated with the resin composition for FRP. Thus, the matrix 4, which has already been described above, will not be further elaborated here.

Reinforcement Sheet

Examples of the reinforcement sheet 5 include woven fabric, nonwoven fabric, knit, and the like. Of these, woven fabric formed of regularly aligned fibers is suitably used. The woven fabric may be manufactured by, for example, the plain weave method, the twill weave method, or the satin weave method. Alternatively, the reinforcement sheet 5 may be a chopped fiber mat formed of randomly-oriented several-centimeter segments of fibers.

Still alternatively, the reinforcement 5 may be, for example, woven fabric which was subjected to deposition with a metallic material such as aluminum, for enhancement of aesthetic appearances.

In weaving the fabric to be used as the reinforcement sheet 5, stranded fibers may be used as the warp and weft, but fiber bundles that are not stranded are more preferably used as the warp and weft. The reinforcement sheet 5 woven of the fiber bundles that are not stranded has, while being comparatively thin and dense in texture, an aesthetic pattern produced by individual threads wide enough in a planar view.

The fiber which may be used to constitute the reinforcement sheet 5 is exemplified by: natural fibers such as cotton, silk and linen; synthetic fibers such as nylon fibers, polyester fibers, aramid fibers (e.g., Kevler™) and Zylon™; and inorganic fibers such as glass fibers, carbon fibers, metallic fibers. Of these, carbon fibers, which can increase the strength of the FRP sheet 1 and produce superior aesthetic appearance, are suitably used.

Examples of the carbon fiber which may be used to constitute the reinforcement sheet 5 include PAN-based carbon fibers formed from polyacrylonitrile (PAN), pitch-based carbon fibers formed from pitch, and the like.

The lower limit of the average diameter of filaments in the carbon fibers constituting the reinforcement sheet 5 is preferably 3 µm, and more preferably 5 µm. The upper limit of the average diameter of filaments in the carbon fibers constituting the reinforcement sheet 5 is preferably 10 µm, and more preferably 8 µm. In the case where the average diameter of filaments in the carbon fiber constituting the reinforcement sheet 5 is less than the lower limit, it may be less easy for the resin composition for FRP to fill the interstice between the filaments in the carbon fiber. Conversely, in the case where the average diameter of filaments in the carbon fiber constituting the reinforcement sheet 5 is greater than the upper limit, the formability of the FRP sheet 1 may be insufficient.

The density of the warp and weft of the fabric to be formed into the reinforcement sheet 5 may be selected according to expected aesthetic appearances, and is, for example, 2 threads/cm or more and 10 threads/cm or less. The number of filaments in fiber bundles used as the warp and weft is, for example, 1,000 or more and 12,000 or less.

Substrate Layer

The substrate layer 2 is a structural material that imparts strength to the molded body, and is typically laminated on the back face side of the FRP sheet 1. Alternatively, the substrate layer 2 may be laminated on the front face side of the FRP sheet 1. In this case, the substrate layer 2 is preferably transparent such that the FRP sheet 1 having aesthetic effects is viewable.

As the material of the substrate layer 2, a resin composition, metal, wood or a composite formed from these materials may be used.

The average thickness of the substrate layer 2 may vary depending on its material as long as adequate strength can be achieved, and is, for example, 1 mm or more and 10 mm or less.

The substrate layer 2 of the molded product illustrated in FIG. 1 includes: a metal layer 6 laminated on a back face of the FRP sheet 1 with an adhesive layer A1 therebetween; an intermediate layer 7 laminated on a back face of the metal layer 6 with an adhesive layer A2 therebetween; and a resin layer 8 laminated directly on a back face of the intermediate layer 7.

Metal Layer

The metal layer 6 is provided in order to improve the impact resistance of the molded product. While being adhered to the FRP sheet 1, the metal layer 6, together with the FRP sheet 1, may be molded by hot pressing.

For example, an aluminum plate, a steel plate or a stainless steel plate may be used as the metal layer 6.

The lower limit of the average thickness of the metal layer 6 is preferably 0.2 mm, and more preferably 0.3 mm. The upper limit of the average thickness of the metal layer 6 is preferably 1.5 mm, and more preferably 1.0 mm. In the case where the average thickness of the metal layer 6 is less than the lower limit, the metal layer 6 may fail to prevent the molded product from cracking under impact. Conversely, in the case where the average thickness of the metal layer 6 is greater than the upper limit, it may be difficult to mold the metal sheet 6 together with the FRP sheet 1.

Intermediate Layer

The intermediate layer 7 is provided in order to improve the adhesion between the metal layer 6 and the resin layer 8, which will be described below. With the intermediate layer 7 being provided, the resin layer 8 may be laminated by, for example, insert molding.

The material of the intermediate layer 7 which may be used is a wooden sheet, woven fabric, nonwoven fabric or any other fibriform material which can be impregnated with a resin.

The lower limit of the average thickness of the intermediate layer 7 is preferably 0.05 mm, and more preferably 0.1 mm. The upper limit of the average thickness of the intermediate layer 7 is preferably 0.5 mm, and more preferably 0.3 mm. In the case where the average thickness of the intermediate layer 7 is less than the lower limit, the adhesion of the intermediate layer 7 to the resin layer 8 may be insufficient. Conversely, in the case where the average thickness of the metal layer 7 is greater than the upper limit, the strength of the molded product may be insufficient.

Resin Layer

The resin layer 8 is formed from a resin composition and allows the substrate layer 2 to have adequate strength and shape stability, and is in turn responsible for adequate strength and shape stability of the molded product.

Examples of the principal component of the resin layer 8 include acrylic resins, polyethylene, polypropylene, polyethylene terephthalate, polycarbonates, nylon, ABS resins, and the like. These components may be used in combination.

The lower limit of the average thickness of the intermediate layer 8 is preferably 1.0 mm, and more preferably 1.5 mm. The upper limit of the average thickness of the intermediate layer 8 is preferably 5 mm, and more preferably 3 mm. In the case where the average thickness of the resin layer 8 is less than the lower limit, the strength of the molded product may be insufficient. Conversely, in the case where the average thickness of the metal layer 8 is greater than the upper limit, the molded product may be unduly heavy.

Adhesive Layers

The adhesive layers A1 and A2 may be optionally provided to offer interlayer adhesion. The adhesive layers A1 and A2 may be made of any appropriate material that enables interlayer adhesion.

Protective Layer

The protective layer 3 is laminated to protect the face of the FRP sheet 1 on the side opposite to the substrate layer 2. The protective layer 3 laminated on the front face side should be transparent such that the FRP sheet 1 is viewable.

Examples of the principal component of the protective layer 3 include acrylic resins, urethane resins, polyesters, and the like.

The lower limit of the average thickness of the protective layer 3 is preferably 0.05 mm, and more preferably 0.5 mm. The upper limit of the average thickness of the protective layer 3 is preferably 2 mm, and more preferably 1 mm. In the case where the average thickness of the metal layer 3 is less than the lower limit, the aesthetic appearances may be inevitably impaired upon breakage of the FRP sheet 1. Conversely, in the case where the average thickness of the protective layer 3 is greater than the upper limit, the molded product may be unduly heavy.

Method for Producing Molded Product

The molded product may be produced by the method including: preparing the resin composition for FRP; obtaining the FRP sheet 1 by impregnating the reinforcement sheet 5 with the resin composition for FRP and by hardening the resin composition; preforming a laminate of the FRP sheet 1, the metal layer 6 and the intermediate layer 7 by hot pressing; performing insert molding by injecting the constituent components of the resin layer 8 into a mold in which a preform obtained after the preforming is placed; forming a protective layer by applying the resin composition to a surface of a molded article obtained after the insert molding and by hardening the resin composition; and trimming a workpiece obtained after the forming of the protective layer.

In the case where the adhesive layers A1 and A2 contain a thermosetting resin as a principal component, the FRP sheet 1, the metal layer 6 and the intermediate layer 7 laminated via the adhesive layers A1 and A2 may be integrated by hot pressing and may be simultaneously molded in the preforming. Alternatively, the FRP sheet 1, the metal layer 6 and the intermediate layer 7 may be integrally bonded to each other with the adhesive layers A1 and A2 in advance to give a laminate, and then, the laminate may be molded in the preforming.

The obtaining of the FRP sheet may include: disposing the reinforcement sheet 5 on a release sheet; pouring the resin composition for FRP onto the surface of the reinforcement sheet 5; and hardening the resin composition for FRP while the surface of the reinforcement sheet 5 is covered with another release sheet.

The obtaining of the FRP sheet preferably involves evacuation to accelerate impregnation of the reinforcement sheet 5 with the resin composition for FRP.

Furthermore, the obtaining of the FRP sheet preferably involves accelerating hardening of the resin composition for FRP through polymerization by heating in furnace, ultraviolet irradiation, or any other means determined according to, for example, the type of the polymerization initiator included in the resin composition for FRP.

Other Embodiments

The embodiments described above do not restrict the constituent features of the present invention. Therefore, constituent elements of each part of the above-described embodiment may be omitted, replaced or added based on the description in the present specification and the common technical knowledge, and such omission, replacement and addition should be construed as falling within the scope of the present invention.

In addition to the components mentioned above, a modifying agent for adjustment of physical properties of the polymerized resin and/or for adjustment of aesthetic appearances may be contained, as an additive, in the resin composition for the FRP where appropriate. Examples of the modifying agent include other various types of monomers, crosslinking agents, fillers, colorants, and the like. As an additive for dispersing the above-mentioned particles, a monomer or the like that binds to, for example, the methyl methacrylate polymer may be used.

A molded product including the FRP sheet which includes the fibrous reinforcement sheet in the matrix containing the hardened resin composition for FRP is construed as one embodiment of the present invention.

The FRP sheet may be obtained by impregnating a laminate of a plurality of reinforcement sheets with the resin composition for FRP and by hardening the resin composition. Such an FRP sheet including a laminate of a plurality of reinforcement sheets has a thickness of, for example, 2 mm or more, and in turn has a comparatively high strength. The molded product may be a molded article obtained by hot pressing the FRP sheet including the laminate of the plurality of reinforcement sheets, with or without a protective layer on a surface of the molded article, and may not include the substrate layer.

The configuration of the substrate layer is not limited to the configuration of the embodiment described above, and may be freely determined. The metal layer, the intermediate layer or the resin layer may be omitted, and/or the number of each layer may be two or more.

According to an alternative production method, a molded product of a desired shape may be obtained in such a manner that the fibrous reinforcement sheet placed inside a mold is impregnated with the resin composition for FRP charged into the mold, and the resin composition is subsequently heated. Specifically, the molded product may be produced by resin transfer molding (RTM), vacuum-assisted resin transfer molding (VaRTM), high-pressure resin transfer molding (HP-RTM), or the like. Alternatively, reaction injection molding (RIM) may be employed in which materials of the resin composition for FRP are charged into a mold, where the resin composition for FRP is prepared and hardened.

Still alternatively, the molded product may be obtained by impregnating the fibrous reinforcement sheet with a resin without using a mold. Specifically, the molded product may be obtained by: forming the fibrous reinforcement sheet into a desired shape such as a tubular shape or a spiral shape (in the state of being wound in multiple layers); impregnating the reinforcement sheet with the resin composition for FRP; and hardening the resin composition. In the forming of the fibrous reinforcement sheet, the fibrous reinforcement sheet may be wound around a core material having a rod shape or any other core having a desired shape. The molded product may be obtained in such a manner that, after impregnation of the fibrous reinforcement sheet with the resin and hardening of the resin, the inside of the fibrous reinforcement sheet and/or the interstice is filled with the resin composition for FRP or another resin composition, and thereafter the resin composition is hardened.

Examples

The present invention is described below in detail by way of Examples, but the present invention should not be restrictively construed as being limited on the basis of the description of the Examples.

Resin Composition for FRP

For verification of the effects of the present invention, the resin compositions for FRP of Examples 1 to 12 and Comparative Examples 1 to 3 were prepared by using components in proportions specified in Table 1 (as expressed in parts by mass).

As methyl methacrylate, "Light Ester M" (Kyoeisha Chemical Co., Ltd.) was used. As the methyl methacrylate polymer, "SR8500" (Asahi Kasei Corporation) was used. As dendrimer acrylate, "Viscoat #1000" (Osaka Organic Chemical Industry Ltd.) was used. As glycidyl methacrylate, "Light Ester G" (Kyoeisha Chemical Co., Ltd.) was used. As the particles containing, in surface layers thereof, an acrylic resin as a principal component, the core-shell particle-dispersed monomer "IBOA-MB302" (containing an acrylic resin as the core) or "IBOA-MB602" (containing butadiene rubber as the core) (Kaneka Corporation) was used. In the core-shell particle-dispersed monomer, core-shell particles (having a mean particle diameter of 0.1 μm) in which the elastic modulus of the shell was greater than the elastic modulus of the core were dispersed in three times by mass of isobornyl acrylate. (Values solely in terms of mass of particles are shown in parentheses in Table 1). As the polymerization initiator, bis(4-t-butylcyclohexyl) peroxidicarbonate "PEROYL TCP" (NOF Corporation) was used. As the modifying agent, neopentyl glycol dimethacrylate "Light Ester NP" (Kyoeisha Chemical Co., Ltd.) was used. Neopentyl glycol dimethacrylate functions as a crosslinking agent, thereby increasing the strength of the polymer to be formed.

FRP Sheet

The FRP sheets of Examples 1 to 12 and Comparative Examples 1 to 3 were obtained in such a manner that fibrous reinforcement sheets were respectively impregnated with the resin compositions of Examples 1 to 12 and Comparative examples 1 to 3, and then, these fibrous reinforcement sheets were sandwiched by release sheets and placed in an oven, where the resin compositions were hardened. As the reinforcement sheets, carbon cloth "C06347B" (Toray Industries, Inc.) was used.

Interior Materials

The FRP sheets of Examples 1 to 12 and Comparative Examples 1 to 3 were placed in a mold, and then a polycarbonate rein "GS2030KR" (Mitsubishi Engineering-Plastics Corporation) was injected, whereby a substrate layer having an average thickness of 2.0 mm was laminated on a back face of each FRP sheet. Subsequently, urethane coating was applied to the surface of the FRP sheet for a primer treatment. Then, an acrylic resin was applied and hardened by heat, whereby a protective layer having an average thickness of 0.6 mm was formed. A resultant laminate of the FRP sheet, the substrate layer and the protective layer was cut into a predetermined shape. In this manner, test pieces of interior materials (molded products) of Examples 1 to 12 and Comparative Examples 1 to 3 were obtained.

Thermal Cycle Test

A thermal cycle test was conducted in which the test pieces of the interior material of Examples 1 to 12 and Comparative Examples 1 to 3 were repeatedly subjected to heating and cooling. The rate of whitening was determined by microscopic inspection of the test pieces after the thermal cycle test. The "rate of whitening" shown in Table 1 refers to a percentage value indicating the occurrence of whitening in which bundles of fibers extending along a cross section of each test piece appeared to be whitish due to bundles of fibers approximately perpendicular to the cross section (whitening on both sides of a contact area of intersecting bundles of fibers).

TABLE 1

| | Methyl Methacrylate | Methyl Methacrylate Polymer | Dendrimer Acrylate | Glycidyl Methacrylate | Core-shell Particle-Dispersed Monomer (Acrylic Resin) | Core-shell Particle-Dispersed Monomer (Butadiene Rubber) | Polymerization Initiator | Modifying Agent | Rate of Whitening |
|---|---|---|---|---|---|---|---|---|---|
| Example 1 | 100 | 12 | 3 | — | — | — | 1 | — | 54 |
| Example 2 | 100 | 12 | — | 14.2 | — | — | 1 | 3 | 56 |
| Example 3 | 100 | 12 | 3 | 10 | — | — | 1 | — | 56 |
| Example 4 | 85.5 | 14.5 | 3 | — | 40 (10) | — | 1 | — | 0 |
| Example 5 | 85.5 | 14.5 | — | 10 | 40 (10) | — | 1 | 3 | 30 |
| Example 6 | 100 | 12 | — | 10 | 40 (10) | — | 1 | 3 | 57 |
| Example 7 | 100 | 12 | — | 10 | 14.5 (3.6) | — | 1 | 3 | 60 |
| Example 8 | 100 | 12 | — | 20 | 14.5 (3.6) | — | 1 | 3 | 58 |
| Example 9 | 100 | 12 | 3 | 10 | 14.5 (3.6) | — | 1 | — | 45 |
| Example 10 | 100 | 12 | 10 | — | — | — | 1 | — | 65 |
| Example 11 | 85.5 | 14.5 | 3 | — | — | 40 (10) | 1 | — | 71 |
| Example 12 | 85.5 | 14.5 | — | 10 | — | 40 (10) | 1 | 3 | 41 |
| Comparative Example 1 | 100 | 12 | — | — | — | — | 1 | — | 100 |
| Comparative Example 2 | 100 | 12 | — | — | — | — | 1 | 3 | 100 |
| Comparative Example 3 | 85.5 | 14.5 | — | — | 40 (10) | — | 1 | 3 | 88 |

The results shown in Table 1 revealed that the interior materials of Examples 1 to 12 obtained by using the resin compositions for FRP of Examples 1 to 12 containing, as a monomer, dendrimer (meth)acrylate and/or glycidyl (meth)acrylate exhibited rates of whitening lower than those exhibited by the interior materials according to Comparative Examples 1 to 3 obtained by using the resin compositions for FRP of Comparative Examples 1 to 3 containing neither dendrimer (meth)acrylate nor glycidyl (meth)acrylate. Although the rate of whitening exhibited by each of the interior materials of Examples 1 to 3 and Examples 5 to 12 was not 0%, only slight whitening was observed on the cross section. Such whitening was visually less noticeable, and conceivably presented practically no significant problem. In contrast, the interior materials of Comparative Examples 1 to 3 exhibited higher rates of whitening. Thus, there is no denying that whitening could occur at site other than the cross section and the vicinity thereof, leading to inadequate aesthetic appearances.

Platy FRP Sheet

Furthermore, platy FRP sheets were produced as sample products by using the resin composition for FRP of Example 3, a thermosetting epoxy resin, a polyamide and an acrylic resin, for comparison of strengths among them.

As the thermosetting resin, "JEB811" (Mitsubishi Chemical Corporation) containing 4% by mass "EMI24" (Mitsubishi Chemical Corporation) as a hardening agent was used. As the polyamide, "UBE Nylon 1015B" (Ube Industries, Ltd.) was used. As the acrylic resin, a resin composition prepared similarly to Comparative Example 2 shown in Table 1, except that "80N" (Asahi Kasei Corporation) was included in place of "SR8500" (Asahi Kasei Corporation), was used.

As the reinforcement sheet, a laminate of nine woven sheets of "TORAYCA C06347B" (Toray Industries, Inc.) formed of carbon fiber bundles woven in twill weave was used.

Table 2 shows results of the determination of the average thickness, the flexural strength and the elastic modulus in flexure of the FRP sheets produced as sample products.

TABLE 2

| | Example 3 | Epoxy Resin | Polyamide | Acrylic Resin |
|---|---|---|---|---|
| Plate Pressure (mm) | 1.8 | 2.0 | 1.9 | 2.0 |
| Flexural Strength (MPa) | 929 | 931 | 820 | 600 |
| Elastic Modulus in Flexure (MPa) | 57.9 | 58.1 | 57.2 | 49.2 |

As shown in Table 2, the flexural strength and the elastic modulus in flexure of the FRP sheet obtained by using the resin composition for FRP of Example 3 containing, as a monomer, dendrimer (meth)acrylate and glycidyl (meth)acrylate were on the same level as the flexural strength and the elastic modulus in flexure of the FRP sheet obtained by using the epoxy resin. Impregnation of the reinforcement sheet with the resin composition for FRP of Example 3 was easier than impregnation of the reinforcement sheet with the epoxy resin.

INDUSTRIAL APPLICABILITY

The resin composition for FRP, the FRP sheet and the molded product according to the embodiments of the present invention may be suitably used as interior materials for automobiles, in particular.

EXPLANATION OF THE REFERENCE SYMBOLS

1 FRP sheet
2 substrate layer
3 protective layer
4 matrix
5 reinforcement sheet
6 metal layer
7 intermediate layer
8 resin layer
A1, A2 adhesive layer table

What is claimed is:

1. A resin composition for fiber reinforced plastic (FRP) with which a fibrous reinforcement sheet of woven fabric, nonwoven fabric or knit is to be impregnated for formation of FRP, the resin composition comprising:
   methyl methacrylate;
   a methyl methacrylate polymer;
   a polymerization initiator; and
   dendrimer (meth)acrylate as a monomer,
   wherein the methyl methacrylate is a component contained in the highest proportion compared to all the other components in the resin composition, and
   a content of dendrimer (meth)acrylate with respect to 100 parts by mass of methyl methacrylate is 1 part by mass or more and 25 parts by mass or less.

2. The resin composition according to claim 1, further comprising particles comprising, at least in surface layers thereof, an acrylic resin, wherein
   the acrylic resin is a component contained in the highest proportion compared to all the other components in the surface layers,
   a mean particle diameter of the particles is 0.02 µm or more and 0.3 µm or less, and
   a content of the particles with respect to 100 parts by mass of methyl methacrylate is 1 part by mass or more and 20 parts by mass or less.

3. The resin composition according to claim 2, wherein each of the particles has a core-shell structure, and
   in the core-shell structure, an elastic modulus of a shell is greater than an elastic modulus of a core.

4. An FRP sheet comprising:
   a matrix; and
   a fibrous reinforcement sheet of woven fabric, nonwoven fabric or knit in the matrix,
   wherein the matrix comprises the resin composition according to claim 1, the resin composition being hardened.

5. A molded product comprising:
   the FRP sheet according to claim 4; and
   a substrate layer laminated on one face side of the FRP sheet.

6. A molded product comprising:
   a matrix; and
   a fibrous reinforcement sheet of woven fabric, nonwoven fabric or knit in the matrix,
   wherein the matrix comprises the resin composition according to claim 1, the resin composition being hardened.

7. The resin composition according to claim 1, further comprising glycidyl (meth)acrylate as the monomer.

8. The resin composition according to claim 7, wherein a content of glycidyl (meth)acrylate with respect to 100 parts by mass of methyl methacrylate is 10 parts by mass or more and 25 parts by mass or less.

9. The resin composition according to claim 7, wherein glycidyl (meth)acrylate forms linkages between molecular chains of the methyl methacrylate polymer obtained by polymerization and fibers constituting the fibrous reinforcement sheet.

* * * * *